United States Patent [19]
Hunter

[11] 3,957,199
[45] May 18, 1976

[54] NAVIGATIONAL AIDS

[76] Inventor: Clive Bromley Hunter, 3 Bushy Road, The Glade, Fetcham, Leatherhead, Surrey, England

[22] Filed: Mar. 4, 1975

[21] Appl. No.: 555,133

[30] Foreign Application Priority Data
Mar. 5, 1974 United Kingdom.............. 9787/74

[52] U.S. Cl...................... 235/61 NV; 235/61 GM; 235/88 N
[51] Int. Cl.²........................................ G06C 27/00
[58] Field of Search ............ 235/61 NV, 61 GM, 88

[56] References Cited
UNITED STATES PATENTS

| | | | |
|---|---|---|---|
| 2,701,096 | 2/1955 | Wattier.......................... | 235/61 GM |
| 2,717,448 | 9/1955 | Lubin et al..................... | 235/61 GM |
| 2,916,203 | 12/1959 | Griffiths........................ | 235/61 NV |
| 2,924,882 | 2/1960 | Paine............................ | 235/61 GM |
| 3,345,752 | 10/1967 | Gabriel......................... | 235/61 GM |

Primary Examiner—Stephen J. Tomsky
Attorney, Agent, or Firm—Oblon, Fisher, Spivak, McClelland & Maier

[57] ABSTRACT

A course correction calculator for use in light aircraft includes two arms pivotally connected together and each independently pivoted over a map supported on a base. The pivot connecting the two arms is slidable longitudinally along one of the arms and the other of the arms is slidable longitudinally relative to one of two pivot points. A protractor is provided at the pivot connecting the two arms to indicate the angle between them and hence course correction when the two independent pivots are at the departure and destination points on the map and the mutual pivot is at the aircraft's position on the map.

7 Claims, 3 Drawing Figures

| STAGE OR LEG | HEIGHT | AIR SPEED | WIND VELOCITY | TRACK | Co(T) | Co(M) | GROUND SPEED |
|---|---|---|---|---|---|---|---|

RADIO FREQUENCIES

NAVIGATIONAL AIDS

The present invention relates to navigational aids and more especially to devices for use in maintaining a correct course to a desired destination when flying light aircraft over comparatively short distances.

Many very sophisticated instruments are available for computing course corrections during the flight of an aircraft. However, such instruments are generally rather expensive and often complicated to use. In practice, pilots of light aircraft often use visual observations and the so-called "1 in 60 rule" to calculate course corrections. Thus, the pilot will check his position against land marks on the ground below and to one side or the other of his flight path. He will then use the said rule to calculate course correction by working out the answer to the equation:

$$\left\{ \frac{\text{Distance off course}}{\text{Distance travelled}} \times 60 \right\} \times \left\{ \frac{\text{Distance off course}}{\text{Distance left to travel}} \times 60 \right\}$$

$$= \text{course correction in degrees.}$$

The arithmatic involved in the "1 in 60 rule" is not difficult but it does require a few moments of concentration and many pilots, especially students, find it difficult to achieve the necessary concentration under flight conditions. Accordingly, there is a need for an inexpensive and simple to use course correction calculator and it is the object of this invention to provide such a calculator.

The present invention provides a course correction calculator comprising a base member for supporting a map;

a first elongate member mounted for pivotal movement over the map about a first point on said map;

a slidable member carried by said first elongate member and movable longitudinally thereof;

a second elongate member pivotally attached to said slidable member and mounted for pivotal movement about a second point on the map spaced from the first pivot point, said second elongate member being slidable longitudinally with respect to at least one of its pivot points; and means movable with the slidable member to indicate the angle between the longitudinal axes of the first and second elongate members.

In use, a map, which term includes a plan or like representation of an area of the earth's surface, is placed on the base member and the map and/or calculator arranged so that the first pivot point is at the point of departure and the second pivot point is at the point of destination as represented on the map. At any time during the course of the flight, the pilot requires to check on his course, he makes a visual observation of a landmark and then moves the slidable member and the first elongate member until the slidable member overlays the representation on the map of the landmark. The angle between the first and second elongate members in said position will give the course correction.

It is preferred that the course correction should be read directly from the calculator of the invention and accordingly that the angle-indicating means should be calibrated in the points of the compass. In this preferred embodiment the said means can be supported for rotational movement with one of the elongate members so that a compass course previously calculated for the flight can be set as the reading when the elongate members are disposed in coaxial relationship and a correction course can be read directly when the said members are mutually inclined. Suitably, the said means comprises a disc calibrated with points of the compass in an anticlockwise sense and rotatable with the second elongate member.

The base member preferably is constituted by a pair of sheets spaced apart to receive the map, at least the upper of said sheets being transparent.

The first elongate member advantageously is a rod or, especially, a rigid wire whilst the second elongate member advantageously is a flat strip of, for example, plastics material having a longitudinally extending slot which receives a pivot pin. Preferably, the points on the map about which said elongate members, especially the second elongate members, are pivoted, are adjustable relative to the base to facilitate location over departure and, especially destination points on the map. Suitably, the first elongate member is pivoted about a fixed pin upstanding from the base whilst the second member is pivoted about a pin extending from a support member slidable over the base in a direction radial of said fixed pin. Alternatively, the base can be provided with a plurality of holes in which pivot pins for one or both of said elongate members can be located. In the case of a two sheet base construction as described above, said holes can be provided in the upper transparent sheet to avoid making holes in the map.

The invention will be clearly understood from the following description of one form (given, however, merely by way of example) which it may assume, and this accompanying will be more readily followed by reference to the acoompanying drawings wherein FIG. 1 represents a plan view of a navigational aid in accordance with the invention:

FIG. 3 represents an enlarged plan view of chart paper in accordance with the invention for use with the device shown in FIGS. 1 and 2.

Figure 1:
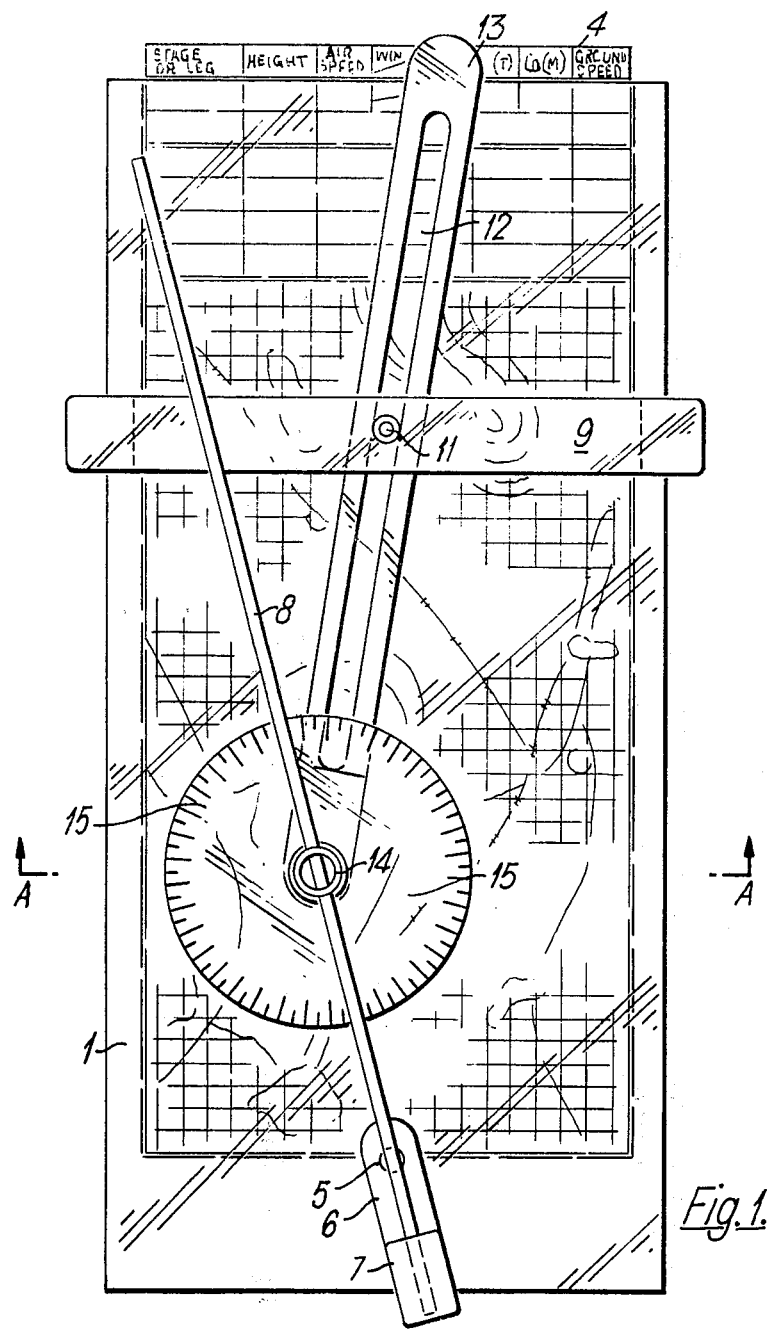

In carrying the invention into effect in one convenient manner, as shown in the aforesaid drawings, a navigational aid, intended more especially for use when flying light aircraft over comparatively short distances, comprises a base-board formed of an upper transparent sheet 1 and a lower sheet 2 (which may also be transparent) held together by spacers 3 along both sides, and one sheet being thickened to close one end, in order to form a shallow "envelope", open at the other end to allow insertion of a sheet 4 of chart paper or a map giving particulars of the landmarks along or near to a proposed route. The sheets of the base-board are preferably of transparent plastics material.

At the mid-point of the inner end of the cavity in the base-board, a pivot 5 through the base-board supports a strip 6 formed with an integral block 7. This strip and block may be moulded from plastics material. In the block 7 is secured a metal or other rod 8 extending over and beyond the axis of the pivot 5.

Figure 2:
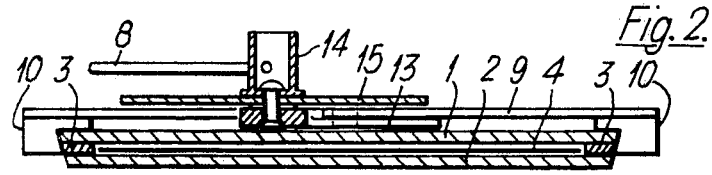
FIG. 2 represents a transverse section in the plane A—A of FIG. 1.

A transverse slide 9, preferably of transparent plastics material has secured beneath each end, e.g. by rivet, a block 10, to fit the edges of the base-board (FIG. 2). The blocks 10 may engage the edges of the board by tongue and groove connection, or, as shown, by undercut faces abutting on chamfered edges of the board. At the mid-point of the slide 9 a downwardly projecting pin or like projection 11 engages in the slot 12 of a longitudinally slotted lever 13, of transparent material, e.g. plastics. The pin 11 forms a pivot for the lever 13. The rod 8 and the lever 13 are pivotally and slidably interconnected e.g. by an upstanding tube or post 14, with a screw or rivet, rotatably mounted in the inner end of the lever 13, through a bore in which tube or post the rod 8 slidably passes. On the lever 13, beneath the tube or post 14 is rotatably mounted a disc 15 calibrated at its edge in degrees to form a protractor, or marked as a compass card. This disc is also transparent, e.g. of plastics material.

In operation a user of the above-described device, e.g. an aircraft pilot or navigator, prepares a flight plan or chart upon calibrated paper, or a part of a map of size to fit into the cavity of the base-board between sheets 1 and 2. The centre line of this map or chart should extend between the point of departure and the destination, of the proposed journey, so that when the plan or map is fitted into the base-board the point of departure is visibly located adjacent to the pivot 5, and the destination visible on the centre line of the chart or map visible at a point of the base-board located towards the remote end of the device. The slide 9 is moved along the base-board to locate the pin 14 of the slide over the destination shown on the chart or map. The post 14 is moved to a position over the centre line of the chart, when, as will be apparent, the rod 8 and lever 13, are aligned with one another over the proposed flight path. The disc 15 is rotated to set beneath the rod 8 the compass bearing to be followed to the desired destination.

At various times, as desired, in the course of the journey, the navigator or pilot moves the post 14 along the rod 8 to position it over successive landmarks shown on the chart or map when he arrives at those points (as observed). Provided the landmarks are located on the pre-arranged course (i.e. shown in the centre line of the chart or map), the rod 8 and lever 13 remain aligned with one another, and with the set course, and the pilot will be satisfied that he has not deviated from the pre-arranged path. If, however, the post 14 is located over a landmark to one side of the marked course the rod 8 and lever 13 become relatively inclined, as shown in FIG. 1. The pilot or navigator will be aware that owing to a transverse wind or other cause, he has deviated from the intended course, and from the disc 15 can read the new compass course or angle of deviation between the course actually followed (shown by the rod 8), and the direction of his destination from the point of observation. He can thereupon correct the line of flight accordingly.

A suitable form of chart paper in accordance with the invention for preparing a flight plan for use as described above is shown in FIG. 3. It may comprise squared paper, each side of each square representing a unit distance, e.g. a mile or a kilometer, with a centre line along its length marked with numerals representing mileage, and abscissa enumeration of miles on each side of the centre line at the lower end of the sheet. The head of the sheet may be provided with "boxes" for useful information, e.g. radio frequencies for signalling etc., and/or for maintaining a log of a journey. The paper is preferably transparent or translucent to facilitate tracing from a map of roads, rivers, reservoirs, churches etc. and other landmarks likely to be observed in the course of the desired journey.

From the above description it will be seen that the invention provides a simple aid for navigation whereby a pilot or navigator can readily make sure that he is adhering closely to a planned course, but it should be understood that the invention is not limited solely to the details of the form described above, which may be modified, in order to meet various conditions and requirements encountered, without departing from the scope of the invention. For example the disc 15 may be held by friction to maintain its original setting in relation to the rod 8 and the direction of destination can then be read along the slot 12 on a compass card or protractor calibrated clockwise in the usual manner. Alternatively if the disc is held by friction to maintain its original setting in relation to the slot 12, the compass card or protractor may be calibrated in reverse sense i.e. counterclockwise so that the rod 8 gives a direct reading of the direction of destination.

I claim:

1. A course correction calculator comprising
   a base member for supporting a map;
   a first elongate member mounted for pivotal movement over the map about a first point on said map;
   a slidable member carried by said first elongate member and movable longitudinally thereof;
   a second elongate member pivotally attached to said slidable member and mounted for pivotal movement about a second point on the map spaced from the first pivot point, said second elongate member being slidable longitudinally with respect to at least one of its pivot points; and
   means movable with the slidable member to indicate the angle between the longitudinal axes of the first and second elongate members.

2. The calculator according to claim 1 in which the angle indicating means is supported for rotational movement with one of the elongate members.

3. The calculator according to claim 2 in which the said means is a disc calibrated with points of the compass in an anti-clockwise sense and is rotatable with the second elongate member.

4. The calculator according to claim 1 in which the second elongate member is a flat strip having a longitudinally extending slot which receives a pivot pin.

5. The calculator according to claim 1 in which at least the second elongate member is pivoted about a pin adjustable relative to the base.

6. The calculator according to claim 5 in which the first elongate member is pivoted about a fixed pin upstanding from the base and the second elongate member is pivoted about a pin extending from a support member slidable over the base in a direction radial of the said fixed pin.

7. The calculator according to claim 1 in which the base comprises a pair of sheets spaced apart to receive a map, at least the upper of said sheets being transparent.

* * * * *